United States Patent [19]

Iglehart et al.

[11] Patent Number: 5,452,347

[45] Date of Patent: Sep. 19, 1995

[54] DUAL-LINE TELEPHONE BRIDGING DEVICE THAT GIVES REMOTE TELEPHONES ACCESS TO COMMUNICATIONS FEATURES

[75] Inventors: David Iglehart, Austin; Gordon Ford, Round Rock; Leland Lester, Austin, all of Tex.

[73] Assignee: Rolm Company, Santa Clara, Calif.

[21] Appl. No.: 1,366

[22] Filed: Jan. 7, 1993

[51] Int. Cl.[6] .................. H04M 1/66; H04M 1/00; H04M 3/42

[52] U.S. Cl. .................... 379/199; 379/157; 379/201; 379/211

[58] Field of Search ............... 379/188, 190, 199, 200, 379/201, 210, 211, 212, 214, 215, 156, 157, 161, 162, 163, 164, 165, 166

[56] References Cited

U.S. PATENT DOCUMENTS 4,893,335 1/1990 Fuller et al. .................. 379/212 X
5,012,511 4/1991 Hanle et al. .................. 379/211

Primary Examiner—James L. Dwyer
Assistant Examiner—Harry S. Hong

[57] ABSTRACT

A feature telephone having an internal mechanism for providing access to its features from a remote location. Without third party intervention or the aid of special features on a PBX or public network, a remote user can set up his office phone to transfer telephony features to another phone, such as his home phone. For example, a user can gain access to his company's tie lines and private network from his home telephone. A user can also bill data calls to his office phone or receive office calls at his home phone without the use of a PBX or public network call forwarding feature. According to another aspect of the mechanism, a user can also set up a password to restrict access to his telephone's features and set up a time of day clock to activate call forwarding and feature access between predetermined hours of the day.

11 Claims, 4 Drawing Sheets

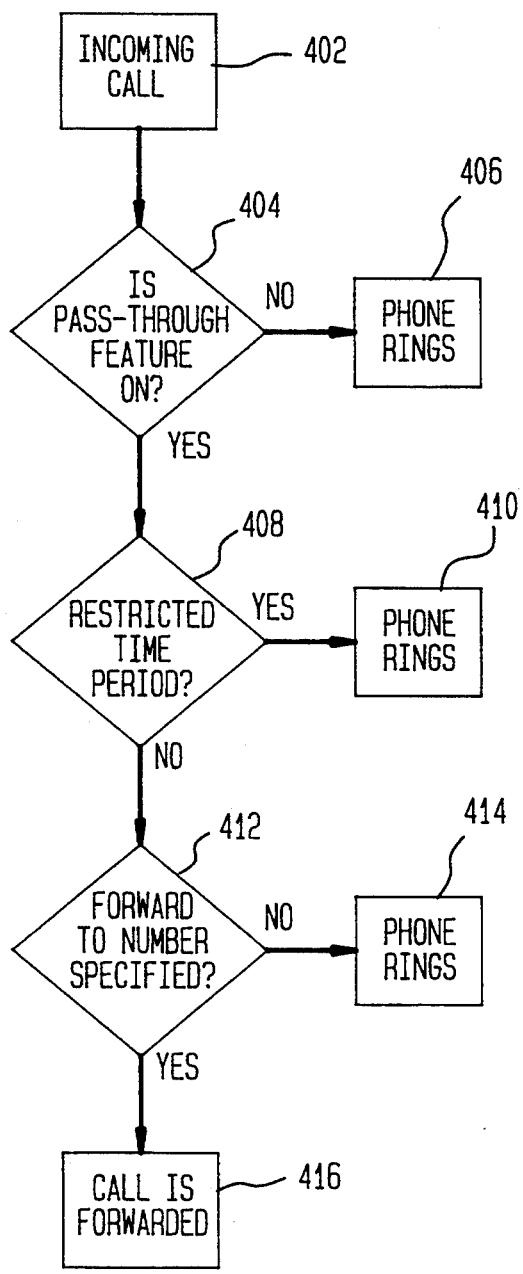

DUAL-LINE TELEPHONE BRIDGING DEVICE THAT GIVES REMOTE TELEPHONES ACCESS TO COMMUNICATIONS FEATURES

I. BACKGROUND OF THE INVENTION a. Field of the Invention

This invention is related to call forwarding and remote access to telephony features.

b. Related Art

Present day telephones may include or have access to a number of useful features. Such features can include, for example, tie lines, private switching networks, WATs lines, conference calling and call transferring. Conventionally, a user can gain access to these features in a variety of ways. Most commonly, the user is physically present at the telephone and accesses the features directly. Alternatively, a user whose phone is connected to a PBX that offers Direct Inward Station Access (DISA) can enter a DISA code from another phone connected to that PBX to gain access to the telephony features of his phone. A user can also request operator assistance from the telephone's switchboard or, in some cases, lease a feature such as call forwarding.

While all of these methods are workable, they require third party intervention, the use of a PBX or special leasing arrangements and availability.

II. SUMMARY OF THE INVENTION

The present invention provides a feature telephone having an internal mechanism for providing access to its features from a remote location. Advantageously, the present mechanism enables a user, without third party intervention, the aid of special features on a PBX or public network, to set up his office phone to transfer telephony features to another phone, such as his home phone. For example, a user can gain access to his company's tie lines and private network from his home telephone. A user can also bill data calls to his office phone or receive office calls at his home phone without the use of a PBX or public network call forwarding feature.

According to another aspect of the present invention, a user can also set up a password to restrict access to his telephones features and set up a time of day clock to activate call forwarding and/or feature access only between predetermined hours of the day.

III. BRIEF DESCRIPTION OF THE DRAWINGS

FIG. 4 is a flow chart of call forwarding according to an embodiment of the present invention.

Like reference numerals appearing in more than one figure represent like elements.

IV. DETAILED DESCRIPTION OF THE PREFERRED EMBODIMENT

Figure 1:
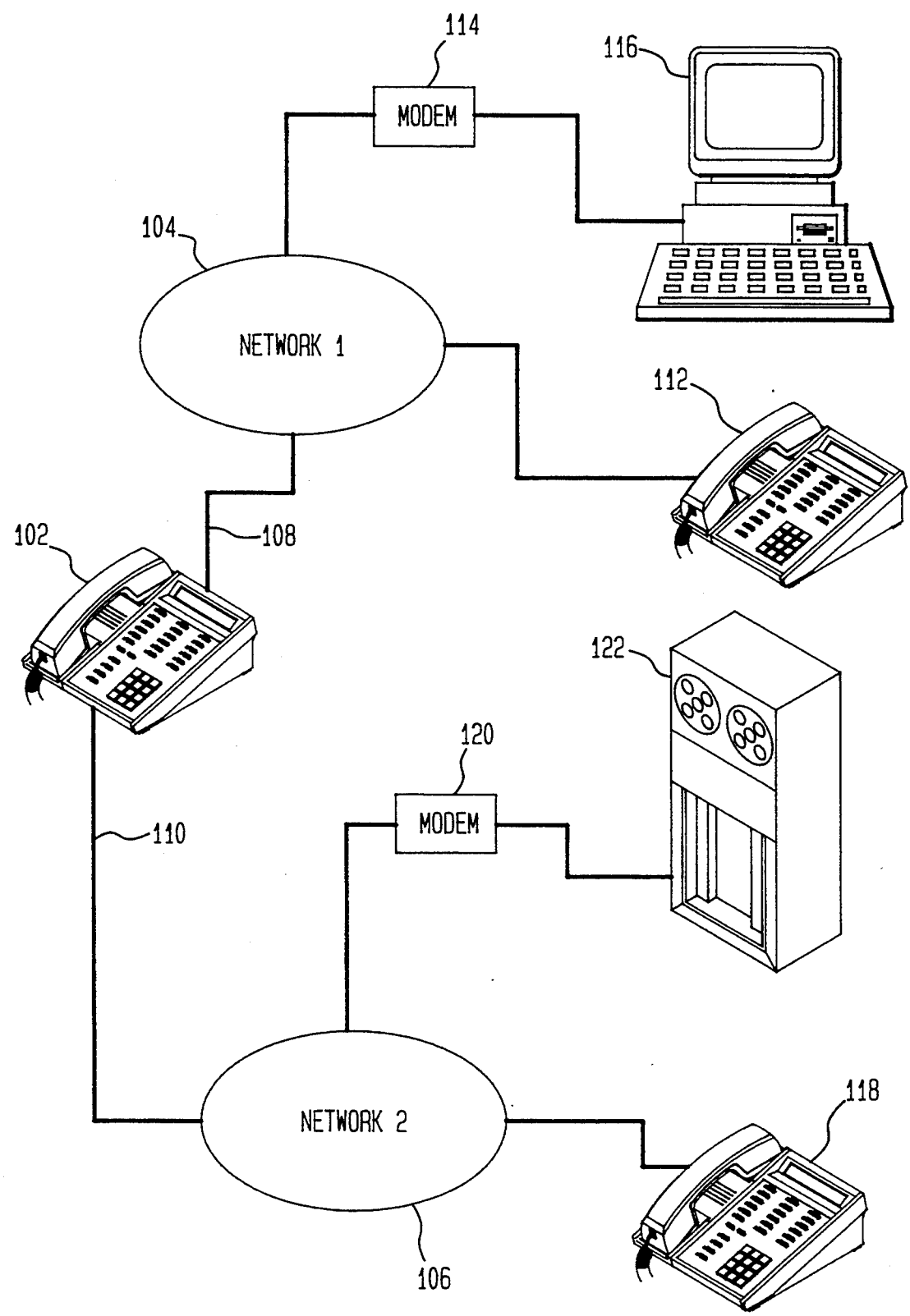
FIG. 1 is a diagram of a dual line feature telephone according to an embodiment of the present invention, and of its interconnection with two networks.

FIG. 1 shows a dual-line analog feature telephone 102 according to an embodiment of the present invention. The telephone 102 includes line connections to two telephone networks 104, 106. The networks 104, 106 can be of a number of different types. For example, a first line 108 of the dual-line telephone 102 can be connected to a private branch exchange (PBX) while the second line 110 can be connected to the public switching system. As is conventional, various types of communications equipment 112-122 can also be coupled to the networks. Typically, a PBX network will have various features such as camp-on, call waiting, tie lines and 800 numbers.

Figure 2:
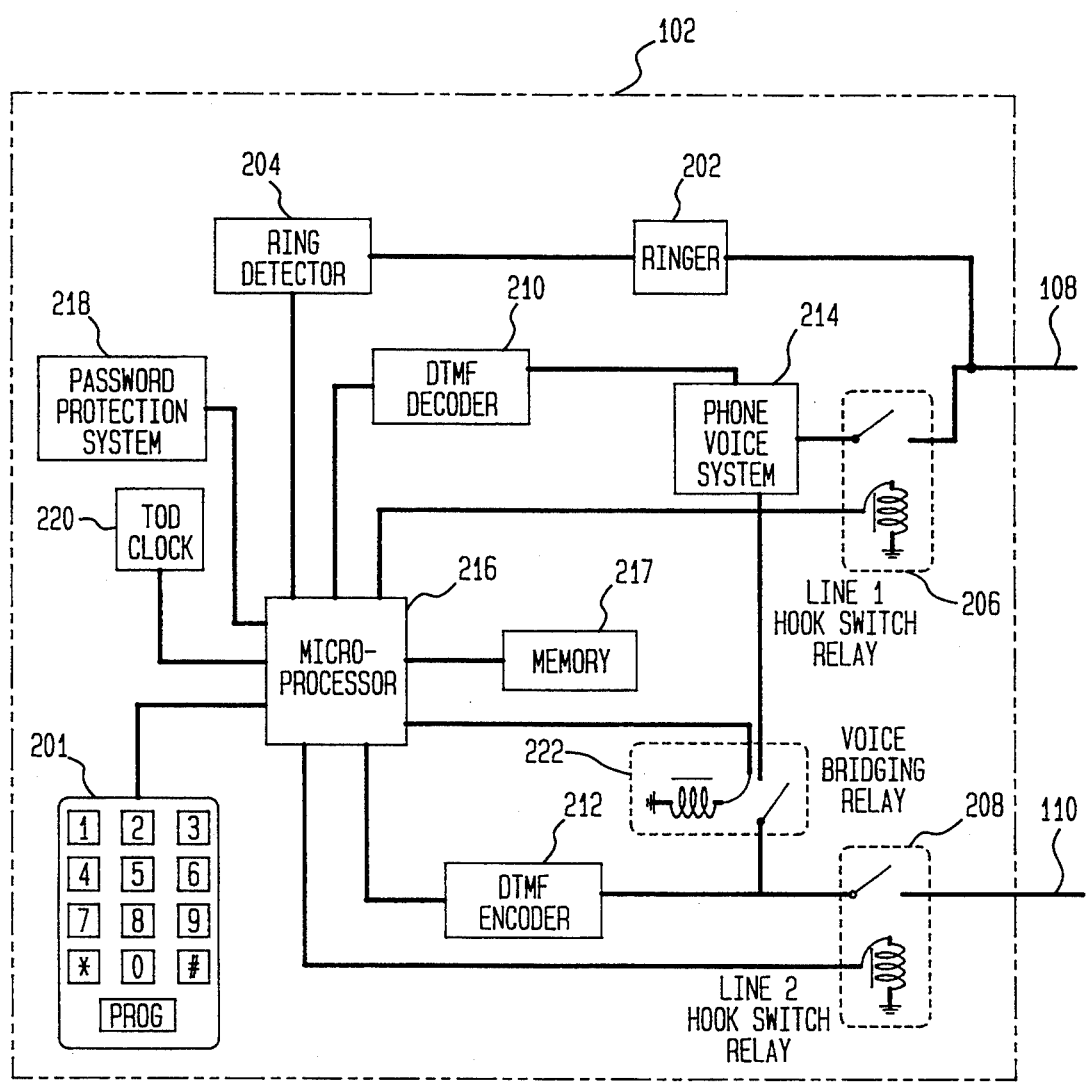
FIG. 2 is a block diagram of the internal logic of the feature telephone of FIG. 1.

A more detailed view of the internals of the dual-line telephone 102 of FIG. 1 is illustrated in FIG. 2. The dual-line telephone 102 is preferably of the Dual-Tone Multi-Frequency (DTMF) type (also known as a touch tone phone). The telephone 102 includes conventional elements such as a keypad 201, a ringer 202, a ring detector 204, a first line (line 1) hook switch relay 206, a second line (line 2) hook switch relay 208, a DTMF decoder 210, DTMF encoder 212 and a phone voice system 214.

The keypad 201 includes both a numeric keyboard and a program key. The program key can be used to enable and disable feature access and to specify a forwarding target for call forwarding. The keypad 210, the ring detector 204, the DTMF decoder 210, the DTMF encoder 212, and both hook switches 206, 208 are connected to and operate under control of a microprocessor 216. The microprocessor 216 is connected to a random access memory which stores both program instructions and data associated with the operation of the present invention.

According to an embodiment of the present invention, the telephone 102 also includes a password protection system 218, a time of day clock 220 and a voice bridging relay 222. Each of these components 218-222 are also connected to the microprocessor 216. According to an aspect of the present system, the TOD clock 216 can be programmed by the user to specify a time period when his telephone will grant feature access to incoming calls. The password protection system 218 can be embodied as a password protection program which compares a received password against a user selected password to determine whether remote access to the features of the telephone 102 should be granted.

The general operation of the telephone 102 is as follows. An incoming call on line 1 activates the ringer 202. The ring detector 204 detects that the ringer 202 has been activated and, in response, signals the microprocessor 216. After a predetermined number of rings (programmed by the user), the microprocessor 216 answers the call by closing the line 1 hook switch relay 206. The incoming DTMF signal is passed through the DTMF decoder 210 (via the phone voice system) to the microprocessor 216, which uses the password protection system 218 to approve access.

Once access is granted, the user can enter a predetermined sequence of key pushes from a remote telephone 112 connected to network 1. Detection of the predetermined sequence of key pushes causes the line 2 hook switch relay 208 to close and give the user access to network 2. Further key pushes can be used to place a call on line 2 and to use all the features available on network 2.

Figure 3:
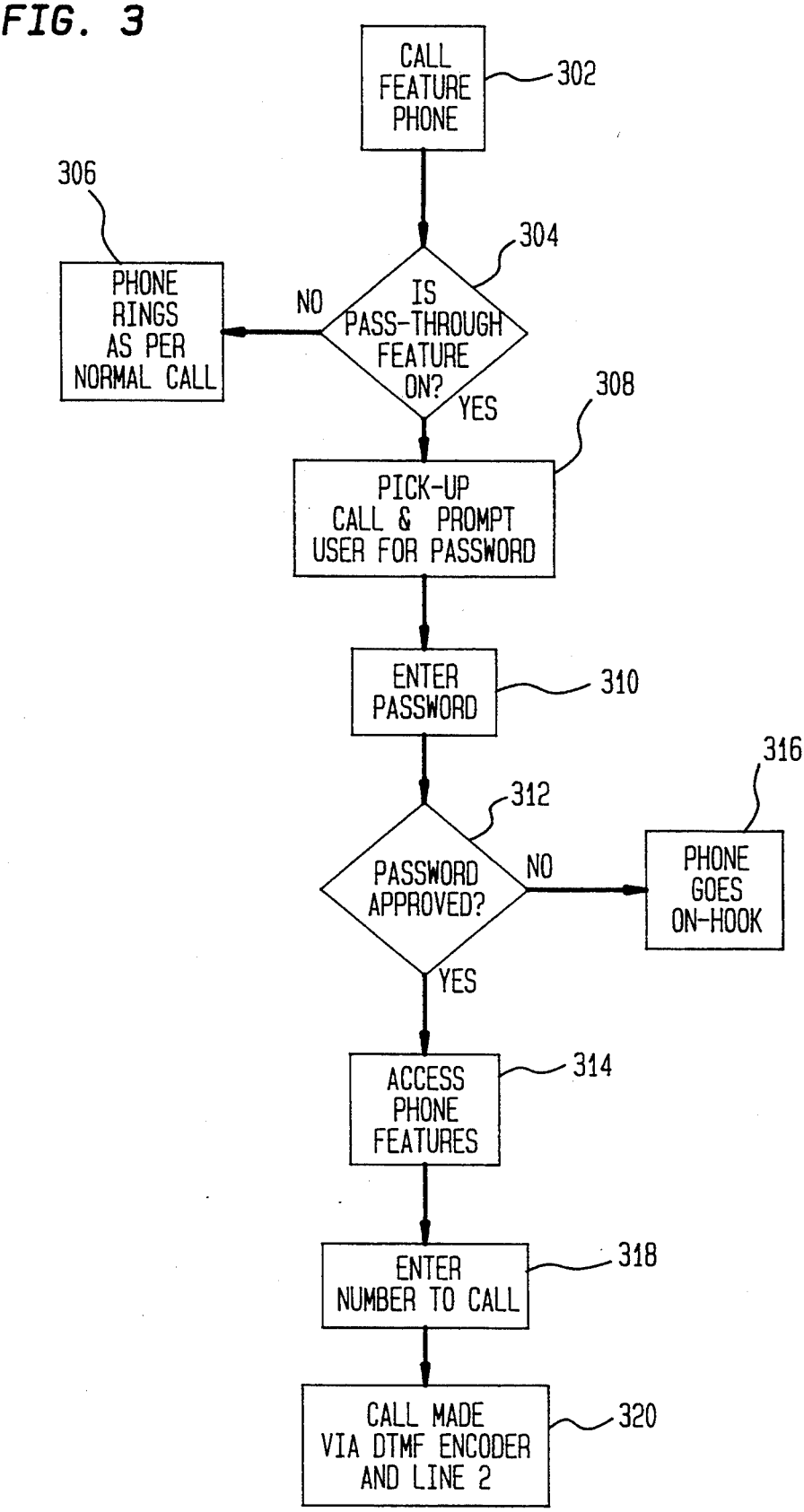
FIG. 3 is a flow chart of remote feature access according to an embodiment of the present invention.

A flow diagram of remote access to communication features according to an embodiment of the present invention is illustrated in FIG. 3. In step 302 a call is placed from a device (such as a telephone) on network 1 to the feature phone 102. In response to detection of the ring by the ring detector 204, in step 304 the microprocessor checks a location in the memory 217 to determine whether the pass-through feature is on. If the pass-through feature is not on, in step 306 the microprocessor takes no action, thus allowing the phone to continue ringing as it normally would for a conventional telephone call. If the pass-through feature is on, in step 308 the microprocessor picks up the call (puts the line 1 hook switch relay off-hook) and prompts the user to enter a password.

The prompting can be done in a number of ways. For example, the microprocessor can generate a tone to indicate that the password should be entered. Alternatively, the microprocessor can generate a synthesized voice requesting that the password be entered or can use a combination of both the telephone and the voice prompt.

It should be understood that the method of FIG. 3 can be alternatively practiced without prompting. Since an authorized user of the telephone's features will likely know that the pass-through feature is present (since that person is likely to have been the one to enable the feature) the user can wait for the phone to pick up and then enter the password within a predetermined time period.

In step 312 the microprocessor 216 (under control of the password protection system 218) checks the password against the user's password (stored in the memory 217). If the passwords do not match (the password is not approved), in step 316 the microprocessor hangs up the phone by putting the line 1 hook switch relay on-hook. If the passwords match (the password is approved), in step 314 the user can access the various telephone features available on the telephone 102. In either the prompted or unprompted embodiment, if the correct password is not entered within a predetermined time period or if the wrong password is entered a predetermined number of times, in step 316 the microprocessor disconnects the call by opening the line 1 hookswitch relay 206 (thereby placing line 1 on-hook).

Once access to the remote features has been granted, the remote user can make a call via the telephone 102. The remote calling feature can be activated by the user by depression of a predetermined sequence on the remote keypad. Once this sequence is detected, the telephone 102 closes the voice bridging relay 222 and the line 2 hookswitch 208. Then, in step 318 the user enters a number to call on the keypad of the remote telephone (or via some other DTMF device). In step 320 the call is made on line 2 via the DTMF signals forwarded via the voice bridging relay 222.

The call can be disconnected by hanging up at the remote station or by entering a DTMF sequence. When the microprocessor 216 determines that the calling station has hung up, it places both the line 1 and line 2 hookswitch relays 206, 208 on-hook. When the microprocessor 216 recognizes that the user has entered a predetermined "feature disconnect" DTMF sequence (from the remote station) it places only the line 2 hookswitch relay on-hook. The microprocessor 216 can also be programmed to disconnect or deactivate particular features in response to other DTMF sequences entered from the remote station.

According to another aspect of the present invention, the telephone 102 can be used for call forwarding purposes, regardless of whether the call forwarding feature is enabled on the PBX. FIG. 4 illustrates the call forwarding feature according to an embodiment of the present invention. In step 402 a user calls the feature phone 102 from a remote location. In response to detection of the ring by the ring detector 204, in step 404 the microprocessor checks a location in memory to determine whether the pass-through feature is on. If the pass-through feature is not on, in step 406 the microprocessor takes no action, thus allowing the phone to continue ringing as it normally would for a conventional telephone call. If the pass-through feature is on, in step 408 the microprocessor checks the TOD clock against a user specified time range (e.g. 7:00 pm–11:00 pm). If the TOD clock indicates that the present time (as indicated by the TOD clock) is not within the specified range, in step 410 the microprocessor takes no action and allows the phone to continue ringing in step 410.

If the TOD clock indicates that the present time is within the specified time range, in step 412 the microprocessor checks another location in memory to determine whether a forwarding number has been specified by the user. If a forwarding number has not been specified, in step 414 the microprocessor takes no action and allows the phone to continue ringing. If a forwarding number has been specified, in step 416 the microprocessor closes the line 2 hookswitch 208 and then makes the call (to the specified number) on line 2 via the DTMF encoder 212. Once the call has been dialed, the microprocessor closes the voice bridging relay 222.

The advantage to closing the voice bridging relay after dialing is that the caller cannot hear the DTMF tones indicative of the user's forwarding number. It should be understood, however, that as an alternative, the microprocessor can close the voice bridging relay before dialing. In any event, the sequence of the closing of the voice bridging relay (before or after dialing) can either be hardcoded into the microprocessor's program instructions or determined by having the microprocessor check a status bit in memory which can be set by the user via the numeric/program keys.

An example of remote feature access and call forwarding using the present telephone will now be described by reference to FIGS. 1 and 2.

Before user X leaves on a business trip, he turns on the remote access feature of his office telephone by typing in a program/number sequence on his telephone's keypad. This sequence is recognized by the microprocessor 216 and causes it to set a bit in the memory 217 indicating that remote access has been enabled. When he arrives at the airport, user X realizes that he needs to get cost estimates from his coworkers at various branch offices. He calls his office phone 102 from an airport payphone on the public network 106. When his office phone rings, its internal microprocessor 216 determines that the remote access feature is on (by checking the bit in memory) and picks up on line 1 (takes the line 1 hookswitch relay off hook). When user X hears his office telephone go off hook, he enters his password, waits for an indication that the password has been accepted (e.g. a tone). User X then uses a second sequence of DTMF key depressions (e.g. #123#) which the microprocessor 216 has been preprogrammed to recognize as the command to put the line 2 hookswitch off hook and close the voice bridging relay. User X then uses his company's tie lines to reach his coworkers, avoiding extra charges and phone calls on the public network.

When user X wants to disconnect from a call, he enters a third DTMF key depression sequence (e.g. #456#), which the microprocessor has been preprogrammed to recognize as the command to open the voice bridging relay and put the line 2 hookswitch relay "on-hook" (hang up the line 2 call). Only the line 2 call is disconnected in response to the third key depression sequence. Thus, user X can continue making tie line calls without making additional calls from the payphone. As he reaches each of his coworkers, he tells them to prepare the cost estimates and relay them to him via his office phone 102 when he reaches his destination. When the user has completed all of his calls, he hangs up the airport payphone. Upon detecting that line 1 has been disconnected, the microprocessor 216 opens the voice bridging relay 222, and opens (places on-hook) the line 1 and line 2 hookswitch relays 206, 208.

When he arrives at his hotel room at his destination at 6:00 PM he calls his office phone again. After entering his password, he enters a fourth DTMF key sequence (e.g. #789*9085551212*1800*2200#) which sets up his office phone 216 to forward incoming WATS line calls directly to his hotel room (at 908 555-1212) until ten o'clock when he would like to sleep. In response to this key sequence, the microprocessor 216 sets the call forwarding ON/OFF status bit to the ON state and stores the times (18:00-22:00) and forwarding number (9085551212) in memory. After he has entered this sequence, each time a telephone call comes into his office telephone, the microprocessor 216 checks the call forwarding ON/OFF status location in memory, the TOD clock 220 and the stored time range. Between 6:00 PM and 10:00 PM the microprocessor picks up the calls by taking the line 1 hookswitch relay off hook, closes the line 2 hookswitch relay, dials the stored number using the DTMF encoder, and then closes the voice bridging relay.

Finally, the next morning at his customer's office, User X uses his notebook computer to reach his office phone and enter his password. Once he has accessed his office phone he disables the call forwarding feature by entering another DTMF key sequence and then uses his office phone's authorization to gain access to his company's restricted ordering system so that he can guarantee delivery and clinch his pending sale.

Now that the preferred embodiments have been described, various changes and improvements that do not depart from the scope and spirit of the invention will become apparent to those of skill in the art. Thus, it should be understood that the preferred embodiments have been described by way of example and not as a limitation. The scope of the invention is defined by the appended claims.

We claim:

1. A private branch exchange (PBX) system comprising:
    a plurality of feature telephones; and
    wherein each telephone includes:
    (a) a first telephone line connected to the PBX system to provide individual access to the telephone;
    (b) a second telephone line connected to provide individual access to a public telephone system by the telephone; and
    (c) processing means within the telephone for selectively connecting the first telephone line to the second telephone line via the telephone upon input of a password, the processing means within the telephone being operable to provide access to a plurality of features by a remote telephone exclusive of the PBX, wherein the access to the plurality of features is provided via the telephone.

2. The PBX of claim 1 wherein each telephone further includes a means, controlled by the processing means, for temporarily opening an electrical path from a dual-tone multi-frequency (DTMF) source to the first telephone line upon input of both the password and a DTMF signal to be transmitted via said second telephone line.

3. A method of operating a dual line feature telephone comprising the steps of:
    coupling the telephone to a first telephone line of a private multi-line network of feature phones;
    coupling the telephone to a second telephone line of a public telephone system;
    detecting when a call has been routed to the telephone on the first telephone line;
    determining whether the telephone is in a call passthrough mode;
    allowing the call to ring through when the telephone is not in the call passthrough mode;
    taking the telephone off-hook when the telephone is in the call passthrough mode;
    monitoring the first telephone line for received DTMF signals;
    disconnecting the call if DTMF signals indicative of an authorized password are not received on the first telephone line; and,
    allowing remote access, by a caller on the first telephone line, to features of the feature telephone and access to the second telephone line connected thereto if the authorized password is received on the first telephone line.

4. The method of claim 3 wherein the step of disconnecting the call occurs if the authorized password is not received within a predetermined fixed period of time.

5. The method of claim 3, comprising the further steps of:
    after the authorized password has been received, monitoring the first telephone line for a predetermined sequence of DTMF signals and, in response to the predetermined sequence of DTMF signals, causing the phone to forward incoming telephone calls to a remote station reachable by way of the second telephone line.

6. The method of claim 5 comprising the further step of:
    before forwarding the incoming telephone calls, checking an actual time-of-day against a programmed time-of-day range indicated by the sequence of DTMF signals; and forwarding the incoming telephone calls only if the actual time-of-day is within the programmed time-of-day range.

7. The method of claim 6 wherein a telephone number of the remote station is stored in a memory within the telephone and wherein the forwarding is performed by the processor within the telephone.

8. A feature telephone of a private multi-line network of feature phones comprising:
    a first hookswitch relay, connected to couple the telephone to the private multi-line network via a first telephone communications line;
    a second hookswitch relay connected to couple the telephone to a second telephone communications line having access to a public telephone system;
    a dual-tone multi-frequency (DTMF) decoder coupled to the first hookswitch relay;
    ring detector means for detecting when a call has been routed to the telephone on the first telephone communications line;
    memory means for storing data indicative of ON/OFF status of a call passthrough mode;

password protection means for determining whether a user has entered an authorized password;

a processor, coupled to the first and second hookswitch relays, the DTMF decoder, the ring detector means, the memory means and the password protection means; the processing comprising:

means for enabling the call to ring through when the passthrough mode is OFF and for closing the first hookswitch relay when the passthrough mode is ON;

means for opening the first hookswitch relay if the user at the remote station fails to enter an authorized password and for enabling the remote user to close the second hookswitch relay if the remote user timely enters an authorized password, wherein closing each of said first and second hookswitch relays couples said first communications line to said second communications line.

9. The feature telephone of claim 8 further comprising: a voice bridging relay coupled to the processor, the first hookswitch relay and the second hookswitch relay, the voice bridging relay being connected to temporarily open upon closing of said second hookswitch relay and upon entrance of a telephone number from said remote station, said voice bridging relay being an electrical connection between said first telephone communications line and a DTMF source.

10. The feature telephone of claim 9 further comprising a DTMF encoder coupled to the processor and the second hookswitch relay.

11. The feature telephone of claim 10 further comprising:

a time-of-day clock coupled to the processor, wherein the memory means further comprises data indicative of an ON/OFF state of a call forwarding mode and data indicative of a telephone number reachable on the second telephone communications line; and, wherein the processor further comprises means, responsive to a detected ring occurring during a predetermined time of day range, for closing the first hookswitch relay and the second hookswitch relay when the memory means indicates that the call forwarding mode is ON and for dialing the telephone number via the DTMF encoder.

* * * * *